(12) United States Patent
Versteegh et al.

(10) Patent No.: US 7,988,364 B2
(45) Date of Patent: Aug. 2, 2011

(54) LUBRICATION SEAL AND WIND TURBINE WITH LUBRICATION SEAL

(75) Inventors: Cornelus Versteegh, Hilversum (NL); Herman Luimes, Dieren (NL)

(73) Assignee: XEMC Darwind B.V., Utrecht (NL)

(*) Notice: Subject to any disclaimer, the term of this patent is extended or adjusted under 35 U.S.C. 154(b) by 0 days.

(21) Appl. No.: 12/473,866

(22) Filed: May 28, 2009

(65) Prior Publication Data

US 2010/0014791 A1 Jan. 21, 2010

Related U.S. Application Data

(63) Continuation of application No. PCT/EP2007/062970, filed on Nov. 28, 2007.

(30) Foreign Application Priority Data

Nov. 28, 2006 (EP) .................................... 06124899

(51) Int. Cl.
*F16C 33/74* (2006.01)
*F16J 15/32* (2006.01)

(52) U.S. Cl. ........................................ 384/486; 277/551

(58) Field of Classification Search .................. 384/477, 384/484, 486, 624; 277/551, 585, 607, 630, 277/637, 647

See application file for complete search history.

(56) References Cited

U.S. PATENT DOCUMENTS

| | | | |
|---|---|---|---|
| 3,773,336 A | 11/1973 | Walter | |
| 4,008,897 A * | 2/1977 | Wentworth | 277/572 |
| 5,605,337 A | 2/1997 | Puri | |
| 5,820,132 A | 10/1998 | Marnot | |
| 7,748,473 B2 * | 7/2010 | Wells et al. | 175/52 |
| 2006/0182634 A1 | 8/2006 | Kirsch et al. | |
| 2007/0127858 A1 | 6/2007 | Nakagawa | |
| 2010/0014791 A1 | 1/2010 | Versteegh | |

FOREIGN PATENT DOCUMENTS

CA 2288230 A1 4/2001
(Continued)

OTHER PUBLICATIONS

Official Search Report of the European Patent Office Patent Office in counterpart foreign application No. PCT/EP2009/052363 filed Feb. 27, 2009.
Written Opinion of the European Patent Office Patent Office in counterpart foreign application No. PCT/EP2009/052363 filed Feb. 27, 2009.

(Continued)

*Primary Examiner* — Thomas R Hannon
(74) *Attorney, Agent, or Firm* — Steven M. Koehler; Westman, Champlin & Kelly, PA

(57) ABSTRACT

A lubrication seal such as an oil seal is described for providing a lubrication barrier to confine lubrication in a bearing with a first bearing ring and second bearing ring, comprising a support ring that rotates with one of the bearing rings, mounted in the support ring are a first seal ring and a second seal ring which seal rings are suitable for forming the lubrication barrier with a sealing surface that rotates with the other bearing ring and which support ring is displaceable from a first sealing position in which the first seal ring forms the lubrication barrier with a first sealing area and the second seal ring does not engage the sealing surface to a second sealing position in which the second seal ring forms the lubrication barrier. The sealing surface comprises a second sealing area that only cooperates with the second seal ring after the support ring is displaced into the second sealing position.

20 Claims, 2 Drawing Sheets

FOREIGN PATENT DOCUMENTS

| | | |
|---|---|---|
| EP | 1653079 A | 5/2006 |
| EP | 1705392 A | 9/2006 |
| EP | 1710432 A | 10/2006 |
| EP | 1927795 A | 4/2008 |
| FR | 2742837 A1 | 6/1997 |
| WO | WO 2004/015288 | 2/2004 |
| WO | WO 2006/099014 A | 9/2006 |
| WO | WO 2009/106610 | 9/2009 |

OTHER PUBLICATIONS

Gustave Paul Corten inventor, U.S. Appl. No. 12/919,913, filed Aug. 27, 2010, application and drawings.

Official Search Report of the European Patent Office in counterpart foreign application No. PCT/EP2007/062970 filed Nov. 28, 2007.

Written Opinion of the European Patent Office in counterpart foreign application No. PCT/EP2007/062970 filed Nov. 28, 2007.

* cited by examiner

LUBRICATION SEAL AND WIND TURBINE WITH LUBRICATION SEAL

CROSS-REFERENCE TO RELATED APPLICATION

This application is a continuation application and claims priority under 35 U.S.C. 120 of international application PCT/EP2007/062970, filed Nov. 28, 2007 and published in English as WO/2008/065153, the content of which is hereby incorporated by reference in its entirety.

BACKGROUND

The discussion below is merely provided for general background information and is not intended to be used as an aid in determining the scope of the claimed subject matter.

Aspects of the invention concern a lubrication seal. Such a seal is known from FR 2742837. The disadvantage of the known seal is that the second seal ring has to seal on the same sealing area as the first seal ring. The lubrication barrier is meant to have a long life expectancy and over a long operation period there might develop damage to the first sealing area. This means that if the lubrication barrier is leaking and the cause of leaking is damage to the first sealing area replacing the first seal ring by the second seal ring does not stop the leaking and does not bring the desired improvement.

SUMMARY

This Summary and Abstract are provided to introduce some concepts in a simplified form that are further described below in the Detailed Description. This Summary and Abstract are not intended to identify key features or essential features of the claimed subject matter, nor are they intended to be used as an aid in determining the scope of the claimed subject matter. In addition, the description herein provided and the claimed subject matter should not be interpreted as being directed to addressing any of the short-comings discussed in the Background.

A lubrication seal assembly such as an oil seal is described for providing a lubrication barrier to confine lubrication in a bearing with a first bearing ring and second bearing ring, comprising a support ring that rotates with one of the bearing rings, mounted in the support ring are a first seal ring and a second seal ring which seal rings are suitable for forming the lubrication barrier with a sealing surface that rotates with the other bearing ring and which support ring is displaceable from a first sealing position in which the first seal ring forms the lubrication barrier with a first sealing area and the second seal ring does not engage the sealing surface to a second sealing position in which the second seal ring forms the lubrication barrier. The sealing surface comprises a second sealing area that only cooperates with the second seal ring after the support ring is displaced into the second sealing position. By creating a new lubrication barrier with a new seal ring that seals on a new sealing area the lubrication barrier will function as completely new.

In accordance with an embodiment the second sealing area is at the side of the lubrication barrier nearest to the bearing when the support ring is in the first sealing position. In this way the second sealing area is protected from outside influences by the lubrication barrier so that damage to the second sealing area is prevented.

In accordance with an embodiment the first sealing area and the second sealing area have the same diameter and whereby the sealing surface has between the first sealing area and the second sealing area a groove with a width that is at least equal to the width of the second seal ring. In this way the first seal ring and the second seal ring can have the same dimensions which makes the support ring more compact and reduces costs.

In accordance with an embodiment the first sealing area and the second sealing area have different diameters. In this way it is avoided to make a groove m the sealing surface and the first seal ring can remain sealing against the sealing surface.

In accordance with an embodiment the material of the seal rings is polytetrafluoroethylene or a similar material. This material reduces friction between the sealing surface and the seal ring and so obtains an increased service life of the seal ring. In accordance with an embodiment the sealing areas are from tempered steel. This lengthens the service life of the sealing surface.

In accordance with an embodiment the sealing areas are part of a bearing ring. This makes it possible to make a compact bearing with a lubrication seal whereby the sealing areas can be made to the same quality as the surfaces of the bearing or if applicable the ball or roller track (s) of the bearing.

An aspect of the invention also concerns a wind turbine with a lubrication seal assembly. The maintenance costs of a wind turbine with a main bearing for supporting the blades are strongly influenced by the service costs of the main bearing. In the known wind turbines replacing the main bearings or the lubrication seals there of is very expensive. By using in the main bearing lubrication seals with increased life expectancy the service costs of the wind turbine are considerably improved.

BRIEF DESCRIPTION OF THE DRAWING

Hereafter the invention is explained by describing various embodiments of the invention with the aid of a drawing. In the drawing

DETAILED DESCRIPTION

Figure 1:
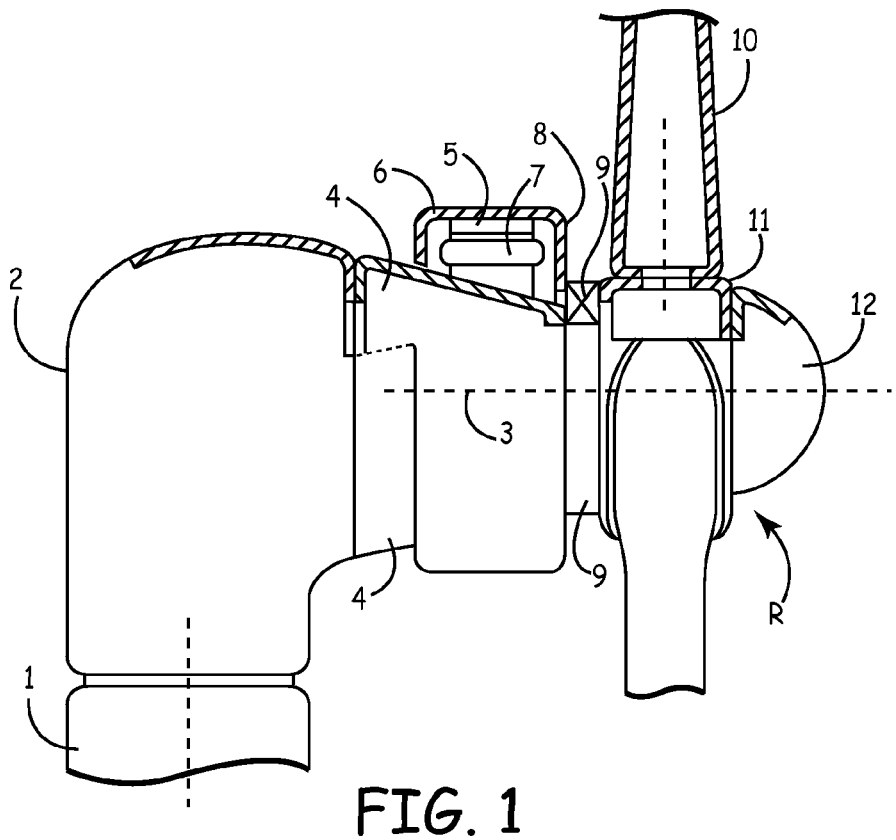
FIG. 1 shows a side view of a wind turbine.

FIG. 1 shows a wind turbine that is placed on a tower 1 and that has a housing 2. The housing 2 is ro-tatable around a vertical axis. A housing ring 4 is with one side attached to the housing 2 and at the other side to a main bearing 9. A rotor R, comprising a hub 11 with blades 10 is attached to the main bearing 9 and can rotate around a centreline 3. At the front side the hub 11 is covered by a cap 12. A generator rotor 6 with permanent magnets 5 is attached via a generator flange 8 to the main bearing 9 and rotates with the rotor R. A generator stator 7 is mounted on the housing ring 4. The permanent magnets 5 move along the windings of the generator stator 7 to generate electrical power. The housing 2 can rotate around the vertical axis so that the rotor R can be directed towards the wind.

The wind turbine is designed with a direct drive generator and the generator rotor 6 is directly driven by the rotor R. The main bearing is located between the housing ring 4 and the rotor R and is designed to absorb the gravitational and aerodynamic loads on the rotor R. The service life of the main bearing 9 determines to a large extend the service life of the wind turbine as replacing the main bearing 9 leads to high costs. In circumstances whereby the wind turbine is placed m difficult accessible locations, for instance at sea, replacing the main bearing 9 during service life must be avoided. The service life of the main bearing 9 depends to a large extend on the service life of the oil seals between the rotating parts and the stationary parts of the main bearing 9. These oil seals are required to ensure that sufficient lubrication means such as oil remains in the main bearing 9. For this application, only oil seals that are mounted as a full ring between a rotating part and a stationary part have a service life that is long enough. Oils seals that are assembled and welded to a full ring around a part always have the weld as a weak spot. This weld reduces the service life to an unacceptable low level and this design is therefore not suitable. The assembly and disassembly of oil seals as full rings generally requires extensive dismantling of the equipment so that extension of the service life of the oil seal device is strongly desired.

Figure 2:
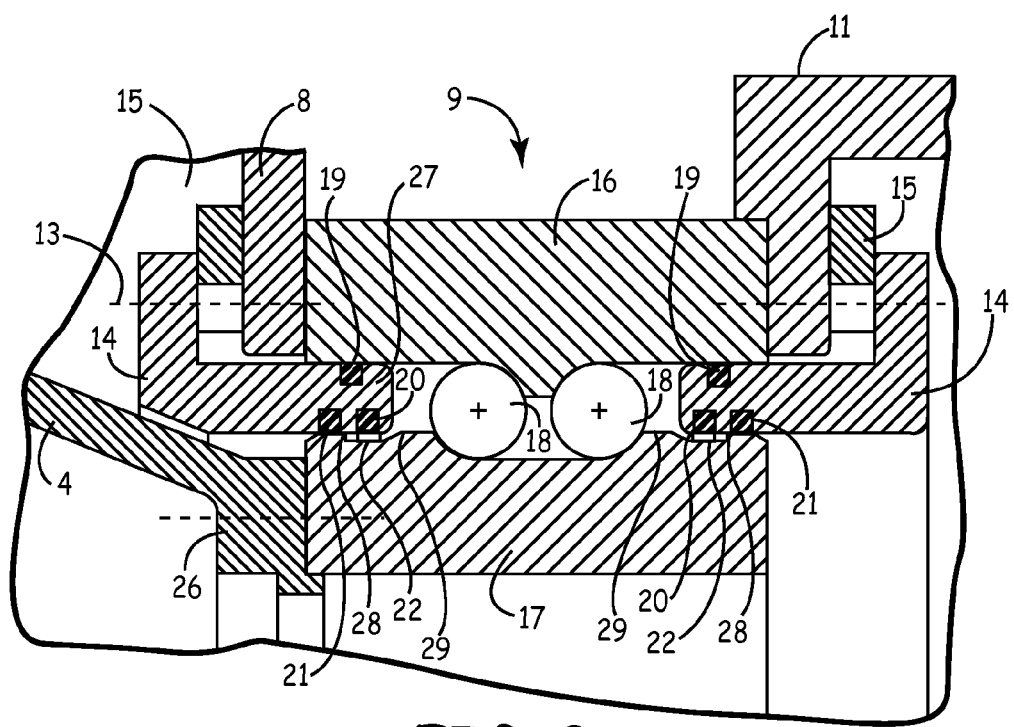
FIG. 2 shows a detailed section of a main bearing of the wind turbine of FIG. 1 with a first embodiment of an oil seal device.

FIG. 2 shows the main bearing 9, which is a ball bearing with balls 18, whereby an oil seal device is mounted between a stationary inner ring 17 and a rotating outer ring 16 on both sides of the balls 18. The inner ring 17 is mounted on a flange 26 of the housing ring 4. The generator flange 8 and the hub 11 are mounted on the outer ring 16. A support ring 14 is coupled to the outer ring 16 by bolts 13. A cylindrical part 27 of the support ring 14 is located between the inner ring 17 and the outer ring 16. A static seal 19 is mounted on the outer circumference of the cylindrical part 27 and seals the opening between the outer ring 16 and the support ring 14.

On the inner circumference of the support ring 14 an interior seal 20 and an exterior seal 21 are mounted, whereby the interior seal 20 is nearest to the parts to be lubricated such as the balls 18 and the exterior seal 21 is nearest to the surroundings. The outer circumference of the inner ring 17 near the support ring 14 has an exterior sealing surface 28 and an interior sealing surface 29 which is nearest to the parts to be lubricated and between the exterior sealing surface 28 and the interior sealing surface 29 a groove 22. The groove 22 has a depth that ensures that the interior seal 20 or the exterior seal 21 are free when located above the groove 22 and do not have any contact with the inner ring 17.

In the position shown in FIG. 2 there is a spacer 15 between the support ring 14 and the outer ring 16 (via the generator flange 8 and the hub 11) and the support ring 14 is m a first position. In this first position of the support ring 14 the exterior seal 21 seals with a flexible sealing lip against the exterior sealing surface 28. The interior seal 20 is above the groove 22 so that there is no contact between the stationary inner ring 17 and the flexible sealing lip of the rotating interior seal 20. As the interior seal 20 is behind the exterior seal 21 it has no influence from any contamination or light and there is no wear on the lip of the interior seal 21. This way the interior seal 20 remains ready for use and as long as it is m this first position, there is no diminishing of its service life. Also the interior sealing surface 29 is protected by the exterior seal 21 and remains ready for use.

After a period the end of the service life of the exterior seal 21 is detected by observing oil leakage between the sealing lip of the exterior seal 21 and the exterior sealing surface 28. After determining that the exterior seal 21 is at the end of its service life the spacer 15 is removed and the support ring 14 is pushed inwards and fastened to the outer ring 16 with the bolts 13 (via the generator flange 8 or the hub 11). The support ring 14 is now in its second position.

In this second position, the flexible sealing lip of the interior seal 20 seals on the interior seal surface 29 and the flexible lip of the exterior seal 21 is free of the inner ring 17 as it is above the groove 22. (In other embodiments it might be possible that the exterior seal 21 remains in sealing contact with the exterior sealing surface 28.) As the service life of the interior seal 20 and the interior sealing surface 29 only starts after the support ring 14 is placed in the second position and the flexible sealing lip of the interior seal 20 contacts the interior seal surface 29, the service life of the oil seal device is twice as long. In order to extend service life of the oil seals as much as possible the exterior sealing surface 28 and the interior sealing surface 29 are preferably from tempered steel and have a ground surface. This way the wear on the flexible sealing lip is reduced as much as possible. The interior seal 20 and the exterior seal 21 are made from flexible material such as rubber or preferably Teflon or similar material m order to obtain a service life that is as long as possible. The service life of an oil seal device that can be obtained m this application with a single seal is approximately 15-20 years, which is slightly less than its expected service life. By using the oil seal device with two oil seals that are in service one after the other the oil seal device is no longer a limiting factor on the service life of the wind turbine. It will be clear that m order to make it possible to displace the support ring 14 m axial direction towards the balls 18 the exterior sealing surface 28 and the interior sealing surface 29 must be provided with a gradual transition such as sloped and/or rounded surfaces in order to avoid damage to the flexible sealing lips of the interior seal 20 or the exterior seal 21. Also the outer ring 16 must be provided with a sloped surface in order to avoid damage to the static seal 19 when the support ring 14 is brought between the inner ring 17 and the outer ring 16. In the embodiment shown m FIG. 2 the main bearing 9 is shown as a double row ball bearing. It will be clear to the skilled man that the invention is applicable for other types of ball bearings and for roller bearings or for any other type of bearing. Also aspects of the invention is applicable for other applications such as an oil seal device between a rotating shaft and a housing, whereby the rotating shaft rotates in roller bearings or ball bearings or in any other type of bearing.

Figure 3:
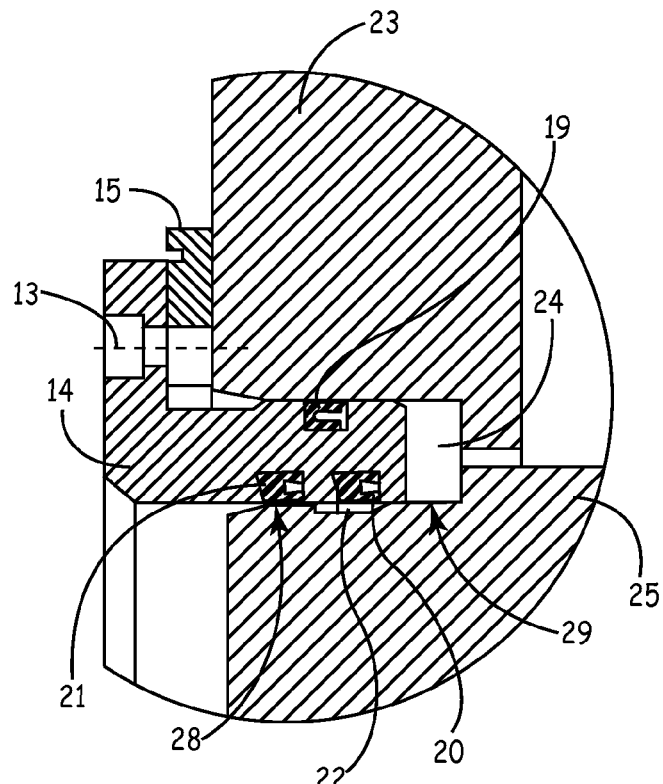
FIG. 3 shows a detail of a second embodiment of an oil seal device in a first position.
Figure 4:
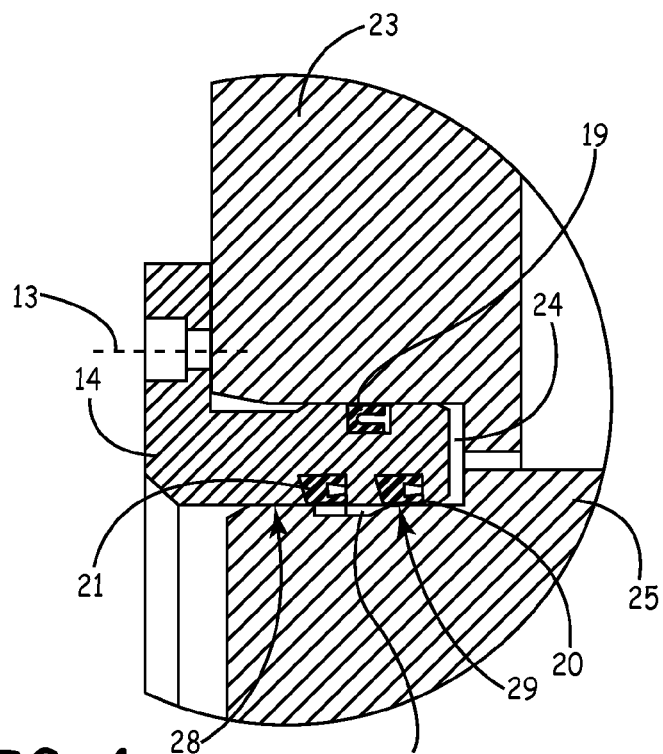
FIG. 4 shows a detail of the second embodiment of an oil seal device in a second position.

FIGS. 3 and 4 show a sealing between an inner ring 25 and an outer ring 23 which rotate relative one another. In this embodiment the support ring 14 is coupled to the outer ring 23 and the exterior sealing surface 28 and the interior sealing surface 29 are on the inner ring 25. It will be clear that this situation is preferred, as grinding an outer surface is easier. However there might be embodiments whereby it is preferred to have the exterior sealing surface 28 and the interior sealing surface 29 on the inside surface of the outer ring 23. In the embodiment shown in FIGS. 3 and 4 the support ring 14 is movable in axial direction m a chamber 24 which is in open connection with space in which the parts to be lubricated such as one or more bearings, gears etc. are located. By using the support ring 14 with the interior seal 20 and exterior seal 21, a doubling of the service of the oil seal device is obtained.

In situations whereby an even longer service life is desirable it is possible to use three or more seal rings with two or more grooves, so that seal rings can be used one after the other. The different grooves will then have an increasing width, seen from the exterior, in order to ensure that after moving the support ring over a small distance to a next position a next seal ring contacts a next sealing surface that has not been used by any other seal ring.

In the described embodiments the interior sealing surface 28 and the exterior sealing surface 29 have the same diameter and also the interior seal 20 and the exterior seal 21 have the same diameter. The same effect of using one oil seal after the other can be obtained without a groove 22 when the interior seal 20 and the interior sealing surface 29 have a slightly larger diameter than the exterior seal 21 and exterior sealing surface 28. In this way the support ring 14 also has a first position in which the exterior ring 21 seals and a second position in which also the interior ring 20 seals.

Although the subject matter has been described in language specific to certain compositions, structural features and/or methodological acts, it is to be understood that the subject matter defined in the appended claims is not necessarily limited to the specific compositions, features or acts described above as has been determined by the courts. Rather, the specific compositions, features and acts described above are disclosed as example forms of implementing the claims. Furthermore, the description herein is provided for purposes of understanding and that the components or functions performed described can be separated or grouped in other ways, if desired.

What is claimed is:

1. A lubrication seal assembly for providing a lubrication barrier to confine lubrication in a bearing having a first bearing ring and a second bearing ring, the second bearing ring having a groove disposed therein, the lubrication seal assembly comprising a support ring being of size to be disposed between the first bearing ring and the second bearing ring, the support ring being configured to be fixated to one of the bearing rings in a first sealing position and a second sealing position, the support ring including a first seal ring and a second seal ring which seal rings are suitable for forming the lubrication barrier, wherein the second seal ring has a sealing portion with a width less than or equal to a width of the groove so as to freely extend therein and not contact the second bearing ring, wherein the support ring is configured such that in the first sealing position and attached to one of the bearing rings the first seal ring forms the lubrication barrier with a first sealing area while the sealing portion of the second seal ring is disposed in the groove and does not engage the the second bearing ring, and wherein the support ring is configured such that only in the second sealing position the second seal ring forms the lubrication barrier with the sealing portion on the second sealing area on the second bearing ring.

2. The lubrication seal assembly according to claim 1 whereby the second sealing area is closer to the bearing than to the first sealing area.

3. The lubrication seal assembly according to claim 1 and whereby the groove is disposed axially between the first sealing area and the second sealing area.

4. The lubrication seal assembly according to claim 1 whereby the first sealing area and the second sealing area have the same diameters.

5. The lubrication seal assembly according to claim 1 whereby the material of each of the seal rings includes polytetrafluoroethylene.

6. The lubrication seal assembly according to claim 1 whereby each of the sealing areas is from tempered steel.

7. The lubrication seal assembly according to claim 6 whereby the sealing areas are located on one of the bearing rings.

8. A wind turbine provided with the bearing that supports a hub with blades whereby the bearing is provided with a lubrication seal assembly according to claim 1.

9. A bearing assembly comprising:
a first bearing ring;
a second bearing ring wherein one of the bearing rings is configured to rotate relative to the other bearing ring, the second bearing ring having a sealing surface including a sealing area, and wherein a groove is disposed therein adjacent the sealing area;
a support ring that is fixable to the first bearing ring in a first sealing position and a second sealing position, the support ring including a first seal ring and a second seal ring wherein each of the first and second seal rings are suitable for forming a lubrication barrier, wherein the second seal ring has a sealing portion with a width less than or equal to a width of the groove so as to freely extend therein and not contact the second bearing ring, wherein the support ring is displaceable from the first sealing position in which the first seal ring forms the lubrication barrier with another sealing area and the sealing portion of the second seal ring is disposed in the groove to a second sealing position in which the sealing portion of the second seal ring forms a second lubrication barrier with the second sealing area, the second lubrication barrier formed between the sealing portion of the second seal ring and the second sealing area only being operational when the support ring is displaced into the second sealing position.

10. The bearing assembly of claim 9 wherein the second bearing ring includes a second sealing surface axially displaced from the first-mentioned sealing surface, the second sealing surface including a second sealing area and wherein a second groove is disposed therein, the bearing assembly further comprising:
a second support ring that is fixable to the first bearing ring in a third sealing position and a fourth sealing position, the second support ring including a third seal ring and a fourth seal ring wherein each of the third and fourth seal rings are suitable for forming a lubrication, wherein the fourth seal ring has a sealing portion with a width less than or equal to a width of the second groove so as to freely extend therein and not contact the second bearing ring, wherein the second support ring is displaceable from the third sealing position in which the third seal ring forms a third lubrication barrier with a third sealing area and the sealing portion of the fourth seal ring is disposed in the second groove to a fourth sealing position in which the sealing portion of the fourth seal ring forms a fourth lubrication barrier with the second sealing area, the lubrication barrier formed between the fourth seal ring and the second sealing area only being operational when the second support ring is displaced into the fourth sealing position.

11. The bearing assembly according to claim 10 whereby the second sealing area is closer to the fourth sealing area than to the third sealing area.

12. The bearing assembly according to claim 10 whereby the material of each of the seal rings includes polytetrafluoroethylene.

13. The bearing assembly according to claim 10 whereby each of the sealing areas is from tempered steel.

14. The bearing assembly according to claim 13 whereby the first, second, third and fourth sealing areas are located on one of the bearing rings.

15. A wind turbine according to claim 10 wherein the wind turbine includes a support and a hub with blades and wherein the bearing assembly is secured to the support and the hub to allow rotation of the hub.

16. A bearing assembly comprising:
a first bearing ring;
a second bearing ring configured to rotate relative to the first bearing ring, a sealing surface including a sealing area, and wherein a groove is disposed in the sealing surface adjacent the sealing area;

a first seal ring;

a second seal ring wherein a width of a sealing portion of the second seal ring is less than or equal to a width of the groove;

a support ring that is fixable to the first bearing ring in a first sealing position and a second sealing position, wherein in the first sealing position the support ring is configured so as to form a lubrication barrier between the first seal ring and another sealing surface while the groove is positioned relative to the second seal ring so that the sealing portion extends therein and does not form a lubrication barrier, and wherein when the support ring is in the second sealing position, the sealing portion of the second seal ring and the sealing area form a second lubrication barrier.

17. The bearing assembly of claim 16 wherein the sealing area is provided on the second bearing ring and the groove is formed in the second bearing ring, and wherein the support ring carries the second seal ring.

18. The bearing assembly of claim 16 and further comprising:

a second sealing surface including a second sealing area, the second sealing surface being axially disposed from the first-mentioned sealing surface, and wherein a second groove is disposed adjacent the second sealing area;

a third seal ring;

a fourth seal ring wherein a width of a sealing portion of the fourth seal ring is less than or equal to a width of the second groove;

a second support ring that is fixable to the first bearing ring in a third sealing position and a fourth sealing position, wherein in the third sealing position the second support ring is configured so as to form a third lubrication barrier between the third seal ring and a third sealing surface while the second groove is positioned relative to the fourth seal ring so that the sealing portion of the fourth seal ring extends therein and does not to form a lubrication barrier, and wherein when the second support ring is in the fourth sealing position, the sealing portion of the fourth seal ring and the second sealing area form a lubrication barrier.

19. The bearing assembly of claim 18 wherein the first-mentioned sealing area is provided on the second bearing ring and the first-mentioned groove is formed in the second bearing ring, wherein the support ring carries the second seal ring, wherein the second sealing area is provided on the second bearing ring and the second groove is formed in the second bearing ring, wherein the second support ring carries the fourth seal ring.

20. A wind turbine according to claim 18 wherein the wind turbine includes a support and a hub with blades and wherein the bearing assembly is secured to the support and the hub to allow rotation of the hub.

* * * * *